United States Patent Office 2,805,144
Patented Sept. 3, 1957

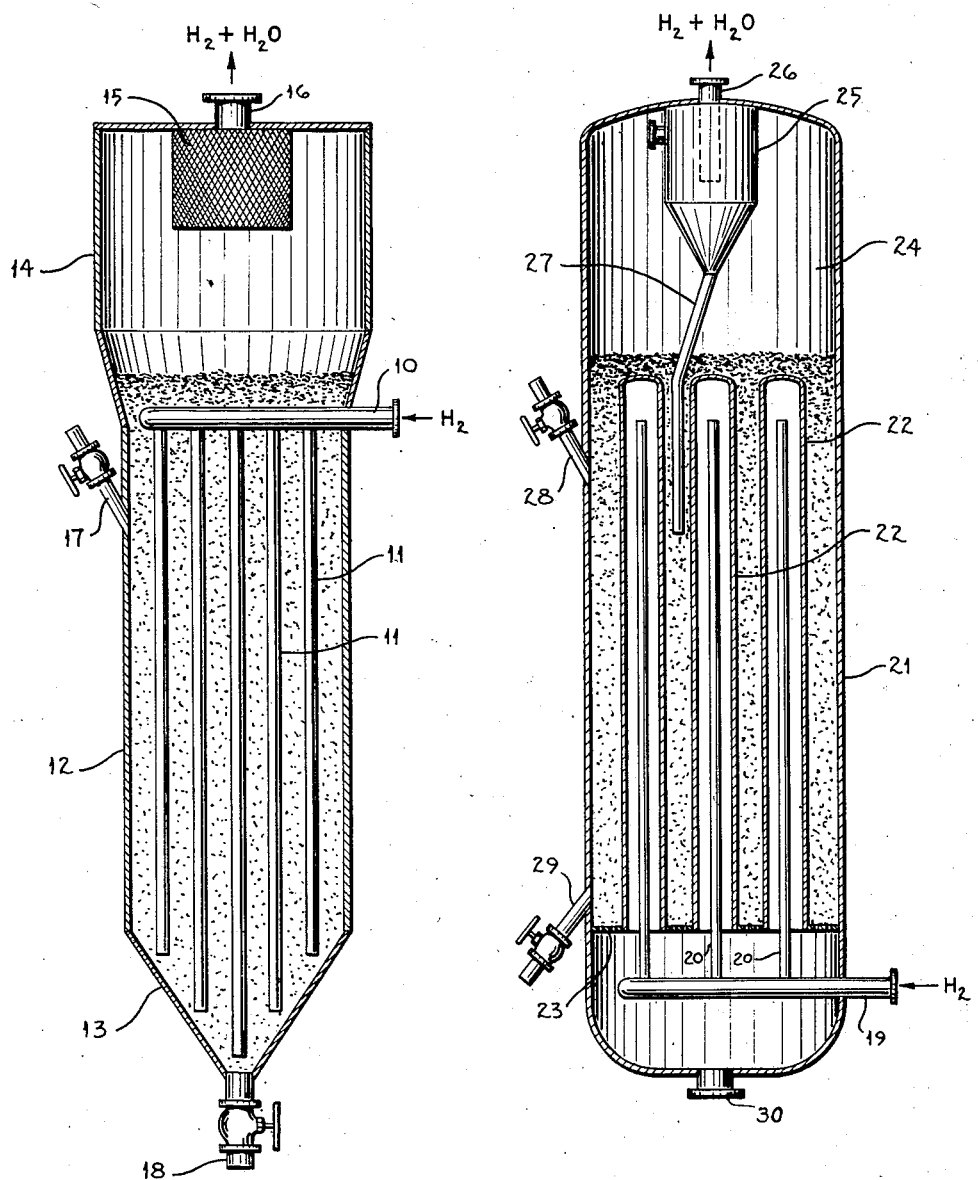

2,805,144

ENDOTHERMIC REDUCTION OF IRON OXIDE

Harold H. Stotler, Westfield, N. J., assignor to Hydrocarbon Research, Inc., New York, N. Y., a corporation of New Jersey Application April 12, 1955, Serial No. 500,815

5 Claims. (Cl. 75—26)

This invention relates to the reduction of iron oxide and more particularly to a method of supplying heat to a mobilized mass of iron oxide particles undergoing reduction.

This invention is an improvement of the process disclosed in the copending application of Keith and Woebcke, Serial No. 331,142, filed January 14, 1953, wherein iron oxide is reduced by passing high-purity hydrogen upwardly through a bed of finely divided iron oxide at a rate to cause mobility of the bed, while maintaining the mobilized bed at a reaction temperature in the range of about 700° to 1000° F. and at a pressure of about 200 to 600 p. s. i. g. (pounds per square inch gauge). The maximum water vapor content of the high-purity hydrogen is related to the reaction temperature, being not in excess of about 0.5% by volume of the hydrogen content of the high-purity hydrogen at a reaction temperature of 700° F. and not in excess of about 3% by volume of the hydrogen content of the high-purity hydrogen at a reaction temperature of 1000° F.

In the process of Keith and Woebcke as well as other prior processes, heat is simply and desirably supplied to the endothermic reduction zone by preheating the hydrogen-containing stream entering the reduction zone. Since the heat of reduction is endothermic by at least 13,000 B. t. u. per mol of water made, the hydrogen stream entering at the bottom of the iron oxide bed cools about 50° to 100° F. during its upward flow, resulting in a cooler upper portion in the iron oxide bed. A decrease of temperature in the mobilized mass adversely affects the rate of reduction since the rate of reaction increases with increasing temperature. Consequently, the upper portion of the iron oxide bed requires additional heat in order to maintain a rate of reduction therein approximating the rate of reduction in the bottom portion of the bed where the preheated hydrogen stream first contacts the bed. Attempts to overcome this heat deficiency in the upper portion of the iron oxide bed by feeding the hydrogen stream at a temperature in excess of about 1000° F. have met with defeat, since the reduced iron particles in a partially reduced iron oxide bed (the very conditions existing in the bottom of the bed) agglomerate or stick together at such temperatures with the ultimate result that the mobility of the bed is seriously impaired or even destroyed. Consequently, a maximum temperature of about 1000° F. must be observed in the hydrogen stream entering the mobilized bed.

A principal object of this invention is to reduce finely divided iron oxide efficiently by introducing heat to a mobilized bed of iron oxide with a hydrogen-containing stream preheated to a temperature exceeding that at which the reduced iron particles would agglomerate.

Additional objects and advantages of the invention will be apparent from the description which follows.

In accordance with this invention, a reducing gas stream rich in hydrogen is preheated to a temperature at least about 50° F. and preferably at least 100° F. above the temperature at which reduced iron particles tend to stick together or agglomerate. The reducing gas stream thus preheated is passed in indirect heat exchange relation with all levels of a mobilized bed of iron oxide particles to maintain all levels of that bed at a temperature approaching, but not attaining, the temperature which causes agglomeration of particles. During this indirect heat exchange, the temperature of the reducing gas stream drops progressively and as soon as it is slightly below that at which agglomeration occurs, the reducing gas stream is brought into direct contact with the iron oxide to effect reduction. In this manner, a high rate of reaction between the hydrogen and iron oxide is achieved without encountering agglomeration difficulties.

Preferably, the preheated reducing gas is introduced into parallel vertical heat exchange tubes which extend through the mass of iron oxide particles undergoing reduction and discharge the reducing gas into the bottom of that mass. As the reducing gas travels within these heat exchange tubes toward the bottom openings thereof, heat is transferred through the tube walls to the mass of iron oxide particles in contact with these tube walls. The heat absorbed by the iron oxide particles promotes the endothermic reduction with a high rate of reaction.

The temperature at which iron particles become sticky varies with the impurities present in the particular or from which the iron particles are derived. However, as found by Keith and Woebcke, the various iron oxides, regardless of composition, can be reduced without agglomeration difficulties at temperatures in the range of 700° to 1000° F. The present invention makes it possible to maintain all portions of a mobilized or fluidized mass of a given iron oxide at approximately the highest reduction temperature in the range of 700° to 1000° F. which is below the temperature at which agglomeration occurs with the reduced iron particles from that particular iron oxide.

The reducing gas enters the bottom of the mass of iron oxide particles and flows up therethrough at a velocity which mobilizes the particles. For the purposes of this invention, especially the transfer of heat from the heat exchange surfaces uniformly to all parts of the mass of iron oxide, the particulate mass should have at least a slow, quasi-viscous movement so that all of the particles will come into contact with the heat exchange surfaces. Generally, the reducing gas will have a superficial linear velocity of at least 0.5 foot per second while flowing through the particulate mass to impart mobility thereto. In most cases, a velocity of about 1.0 to 1.5 feet per second is preferred. Higher gas velocities such as 2 to 3 feet per second may be used to impart the more rapid movement and turbulence of fluidized particles. A highly fluidized mass is very desirable from the viewpoint of a high rate of heat transfer at the heat exchange surfaces in contact with the fluidized particles but is frequently avoided because the entrainment of solids in the gases leaving the fluidized mass increases with the gas velocity.

The reduction which is preferably conducted at pressures in the range of 350 to 450 p. s. i. g. and frequently at temperatures above 900° F. is effected with a gas stream containing hydrogen as the major component on a volume basis. This high-purity hydrogen stream which may contain methane, nitrogen, argon, carbon oxides and water vapor has a composite average molecular weight not exceeding 10. However, the moisture content of the reducing gas entering the reducing zone is restricted in accordance with the following table:

| Maximum H$_2$O Vapor Content Based on H$_2$ Content | Reaction Temperature, °F. |
|---|---|
| Percent by volume: | |
| 0.5 | 700 |
| 1.0 | 800 |
| 1.5 | 850 |
| 2.0 | 900 |
| 2.5 | 950 |
| 3.0 | 1,000 |

Preferably, the moisture content of the reducing gas should not exceed the saturation value when the gas is at operating pressure but at a temperature of 100° F. Thus, in a reducing operation where the hydrogen-containing gas contacts the iron oxide at a pressure of 400 p. s. i. g., the initial moisture content of that gas would be only about 0.2% by volume (saturation value at 100° F.).

Reference is now made to the drawings of which:

Figure 1 is a sectional elevation of an apparatus illustrating one embodiment of the invention; and Figure 2 is a similar view of an alternative structure which further illustrates the invention.

In accordance with Figure 1, a preheated stream of high-purity hydrogen is introduced through feed line 10 in the top portion of reducing vessel 12 into a multiplicity of vertical heat exchange tubes 11 which are spaced from one another and terminate with open ends in bottom 13 of vessel 12. The gas flowing downwardly through tubes 11 discharges into the bottom of a mass of iron oxide particles surrounding tubes 11. The gas then flows uniformly up through the particulate mass at a velocity which mobilizes the particles. While the gas in feed line 10 is at a temperature about 100° to 200° F. higher than the agglomerating temperature for the particulate material in vessel 12, the temperature in the mobilized mass is about 10° to 30° F. below the agglomerating temperature. The heat given up by the gas in flowing from feed line 10 to the ends of tubes 11 is consumed by the endothermic reaction of the hydrogen contacting the mobilized mass of iron oxide. The gas after flowing up, usually 20 to 40 feet, through the mobilized bed, leaves dome 14 of reducer 12 through filter 15 which removes entrained solid particles from this gas. The water produced by the reaction of hydrogen with iron oxide is swept out of reducer 12 as water vapor in the gas withdrawn through outlet 16. The withdrawn gas, still rich in hydrogen, may be reused after eliminating the water of reaction. A portion of the withdrawn gas is also discarded to prevent the building up of the concentration of inert components like methane and nitrogen in the recycled gas. Fresh high-purity hydrogen is added to the recycled gas to balance the hydrogen consumed and lost in the operation. Finely divided iron oxide may be introduced into reducer 12 through valved line 17 and the reduced iron particles may be withdrawn through valved line 18 at the bottom of reducer 12.

In Figure 2, preheated high-purity hydrogen is fed through feed line 19 situated at the bottom of reducing vessel 21 into vertical tubes 20 which discharge the gas through their upper open ends into heat exchange tubes 22. Tubes 22 are disposed vertically in spaced relation to one another so as to provide heat exchange surface substantially throughout the reaction zone. The upper ends of tubes 22 are closed but the lower ends are open. The gas from tubes 20 passes down heat exchange tubes 22, discharges into the space below perforated plate 23 and flows up through the perforations of plate 23 into a bed of iron oxide supported by plate 23. The gas rises with sufficient velocity through the bed to fluidize the particles and by means of this intimate contact the reduction of iron oxide is effected. The reaction gases leave the fluidized bed, which has an upper level somewhat higher than the upper ends of tubes 22, and flow through cyclone separator 25 disposed in dome 24. Entrained particles are removed from the reaction gases, partly by settling out in dome 24 and partly by centrifugal force in cyclone 25. The reaction gases, rich in hydrogen but containing water of reaction, exit through outlet 26, while the solids removed therefrom in cyclone 25 are returned to the fluidized bed through standpipe 27. Finely divided solids may be added to reducer 21 through valved line 28 near the top of the fluidized bed of solid particles and may be withdrawn through valved line 29 near the bottom of the bed.

In an illustrative example of the invention involving a reducer similar to that of Figure 1, high-purity hydrogen containing methane and nitrogen as the principal inert impurities and having a composite average molecular weight of 5.4 and a water vapor content of about 0.2% by volume, is charged through line 10 at a pressure of 400 p. s. i. g. and at a temperature of 1100° F. The gas flows downwardly through heat exchange tubes 11, passes out through the open ends of these tubes at a temperature of about 985° F. and contacts a mobilized bed of finely divided magnetite at a temperature of 980° F. The gas travels upwardly through the bed of solid particles with a superficial linear velocity of about 1 foot per second thereby mobilizing the bed and reducing the iron oxide particles. The bed in reducer 21 is approximately 30 feet deep. The reaction gases emerging from dome 14 contain the water of reaction and after withdrawal through outlet 16 are scrubbed with water at the operating pressure and a temperature of 95° F. The major portion of the washed gas, still rich in hydrogen, is recycled to line 10 after fresh make-up hydrogen has been added thereto and the total gas has been pre-heated to the aforesaid 1100° F.

After approximately 10 hours of operation, the mobilized solids are withdrawn from reducer 12 through valved line 18. Analysis shows that about 92% by weight of the magnetite appears as completely reduced iron in the withdrawn material.

Tests show that the particular magnetite originally charged to reducer 12 agglomerates when the reduction is attempted with bed temperatures in the range of 990° to 1000° F. and higher.

While the foregoing example illustrates batchwise operation, the process of the invention may also be carried out on a continuous basis. For instance, the reducer of Figure 1 may have a sufficient height that iron oxide fed to the reducer through valved line 17 will be reduced to the desired extent by the time that it moves down through reducer 12 to the point of withdrawal at valved line 18. In such case, it is advisable to place in reducer 12 vertical partitions so as to minimize top-to-bottom mixing of the solid particles in the mobilized bed and thus aid the maintenance of a composition gradient through the vertical extent of the mobilized bed. In other words, the top of the bed will have a composition essentially that of the iron oxide fed to the bed and the content of reduced iron will increase progressively at succeeding lower levels in that bed until at the bottom of the bed the composition will be essentially that of the material withdrawn through line 18. The rate of travel of the solid particles down through reducer 12 is correlated with the depth of the bed and the rate at which the reducing reaction proceeds under the selected reaction conditions.

It is well to note that heat is supplied to all portions of the mobilized bed of iron oxide particles at a high rate by transfer from the heat exchange surfaces uniformly distributed throughout the bed. While it is very desirable to maintain the bed temperature as high as possible without reaching the temperature at which agglomeration of the particles commences, it is advisable to operate with a bed temperature approximately 10° to 30° F. below that temperature at which agglomeration begins. However, the temperature of the heat exchange surfaces in contact with the mobilized bed may be only 2° or 3° F. below the agglomerating temperature. Under such circumstances, the difference in temperature between the heat exchange surfaces and the mobilized solid particles promotes a high flow of heat to the solid particles undergoing reduction without encountering agglomeration troubles.

In view of the various modifications of the invention which will occur to those skilled in the art upon consideration of the foregoing disclosure without departing from the spirit or scope thereof, only such limitations should be imposed as are indicated by the appended claims.

What is claimed is:

1. In the endothermic reduction of iron oxide in the form of solid particles by reaction with high-purity hydrogen to form a substantial amount of free iron, while a bed of said particles is maintained in a mobilized condition, said bed having an upper level from which reaction gases leave said bed, and said high-purity hydrogen containing not more than a minor amount of carbon oxides, methane, nitrogen, argon and water vapor and initially having a composite average molecular weight not exceeding 10, the improvement of supplying heat to said bed which comprises passing said high-purity hydrogen, preheated to a temperature above that at which said particles agglomerate, in indirect heat exchange relation with said bed to supply heat thereto and cool said high-purity hydrogen, and bringing said high-purity hydrogen into reacting contact with said bed after said high-purity hydrogen has been cooled to a temperature below that at which said particles agglomerate.

2. The process of claim 1 wherein the reduction temperature in said bed is in the range of 700° to 1000° F. and the high-purity hydrogen passed in indirect heat exchange relation with said bed is initially at a temperature at least 50° F. higher than said reduction temperature.

3. The process of claim 1 wherein the reduction temperature in said bed is in the range of 900° to 1000° F. and the high-purity hydrogen passed in indirect heat exchange relation with said bed is initially at a temperature at least 100° F. higher than said reduction temperature.

4. In the endothermic reduction of iron oxide in the form of solid particles by reaction with high-purity hydrogen to form a substantial amount of free iron, while a bed of said particles is maintained in a mobilized condition, said bed having an upper level from which reaction gases leave said bed, and said high-purity hydrogen containing not more than a minor amount of carbon oxides, methane, nitrogen, argon and water vapor and initially having a composite average molecular weight not exceeding 10, the improvement of supplying heat to said bed which comprises passing said high-purity hydrogen, preheated to a temperature at least 50° F. higher than a predetermined reduction temperature which is both below 1000° F. and below the temperature at which said particles agglomerate, the preheat temperature being above the temperature at which said particles agglomerate, downwardly in indirect heat exchange relation with said bed to supply heat thereto and cool said high-purity hydrogen, and flowing said high-purity hydrogen upwardly in reacting contact with said bed after said high-purity hydrogen has been cooled to substantially said predetermined reduction temperature below 1000° F. and below the temperature at which said articles agglomerate.

5. The process of claim 4 wherein the predetermined reduction temperature in said bed is at least 700° F. and the high-purity hydrogen passed in indirect heat exchange relation with said bed is initially at a temperature at least 100° F. higher than said predetermined reduction temperature.

References Cited in the file of this patent

UNITED STATES PATENTS

| 2,399,984 | Caldwell | May 7, 1946 |
| 2,418,394 | Brown | Apr. 1, 1947 |

OTHER REFERENCES

Tenenbaum: "Direct Reduction of Iron Ore Using the Fluidized Solids Technique." (Pages 1, 4–8), (preprint of paper read at meeting of American Iron and Steel Institute, at New York, May 23–24, 1951.)